(12) United States Patent
Hirata et al.

(10) Patent No.: US 7,475,533 B2
(45) Date of Patent: Jan. 13, 2009

(54) EXHAUST GAS PURIFYING APPARATUS AND METHOD FOR CONTROLLING IT

(75) Inventors: Hirohito Hirata, Suntohou-gun (JP); Kazunobu Ishibashi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/265,169

(22) Filed: Nov. 3, 2005

(65) Prior Publication Data
US 2006/0113181 A1   Jun. 1, 2006

(30) Foreign Application Priority Data
Nov. 29, 2004   (JP)   ............................... 2004-343519

(51) Int. Cl.
*F01N 3/00*   (2006.01)
(52) U.S. Cl. ............................. 60/275; 60/274; 60/278; 60/286; 60/301
(58) Field of Classification Search .................. 60/274, 60/275, 278, 286, 297, 301, 311; 422/186.03, 422/186.07, 186.08
See application file for complete search history.

(56) References Cited

U.S. PATENT DOCUMENTS

| | | | |
|---|---|---|---|
| 5,746,984 A | 5/1998 | Hoard | |
| 5,894,728 A | 4/1999 | Wakamoto | |
| 6,176,078 B1 | 1/2001 | Balko et al. | |
| 6,363,716 B1 | 4/2002 | Balko et al. | |
| 6,560,958 B1 | 5/2003 | Bromberg et al. | |
| 6,655,130 B1 * | 12/2003 | Kirwan et al. | 60/284 |
| 6,912,841 B2 * | 7/2005 | Pfendtner et al. | 60/275 |
| 6,957,528 B1 * | 10/2005 | Cho | 60/275 |
| 7,021,048 B2 | 4/2006 | Taylor, III et al. | |
| 7,090,811 B2 * | 8/2006 | Cho et al. | 60/275 |
| 2002/0012618 A1 | 1/2002 | Bromberg et al. | |

(Continued)

FOREIGN PATENT DOCUMENTS

EP   1 421 987 A2   5/2004

(Continued)

OTHER PUBLICATIONS

U.S. Appl. No. 10/583,311 to Hirata et al. filed Jun. 15, 2006.

*Primary Examiner*—Thomas E Denion
*Assistant Examiner*—Diem Tran
(74) *Attorney, Agent, or Firm*—Oliff & Berridge, PLC

(57) ABSTRACT

The present invention provides an exhaust gas purifying apparatus 10 which can effectively purify an exhaust gas with the use of a plasma. The present exhaust gas purifying apparatus 10 comprises a $NO_x$ purifying catalyst 1 disposed in an exhaust gas pipe 11 for an internal combustion engine (ENG); a plasma generator 2 for converting a gas into a plasma and supplying the plasma to the exhaust pipe at the upstream of the $NO_x$ purifying catalyst; a switching device 3 for selectively supplying one of a recirculated exhaust gas 13 and air 12 as a gas to be converted into a plasma to the plasma generator 2; and an injector 4 for adding a reducing agent to the gas 14 to be converted into a plasma or a plasma 15 converted from the gas by the plasma generator. The present invention further provides a method for controlling the exhaust gas purifying apparatus.

2 Claims, 11 Drawing Sheets

U.S. PATENT DOCUMENTS

| | | |
|---|---|---|
| 2004/0098977 A1 | 5/2004 | Kupe et al. |
| 2004/0216451 A1 | 11/2004 | LaBarge et al. |
| 2005/0103001 A1 | 5/2005 | Kupe et al. |

FOREIGN PATENT DOCUMENTS

| | | | |
|---|---|---|---|
| EP | 1705346 | | 9/2006 |
| FR | 2635850 | * | 2/1990 |
| GB | 1020486 | | 2/1966 |
| JP | A-6--343820 | | 12/1994 |
| JP | A-2001-159309 | | 6/2001 |

* cited by examiner

EXHAUST GAS PURIFYING APPARATUS AND METHOD FOR CONTROLLING IT

This application claims priority to Japanese Patent Application No. JP-A-2004-343519, filed Nov. 29, 2004, the disclosure of which is hereby incorporated by reference herein in its entirety.

TECHNICAL FIELD

The present invention relates to an exhaust gas purifying apparatus and a method for controlling it and, particularly, to an exhaust gas purifying apparatus for purifying an exhaust gas from an internal combustion engine and a method for controlling it.

RELATED ART

Exhaust gases, e.g. from automobiles, garbage incineration plants, etc., are generally discharged to the atmosphere after being purified mainly with use of catalysts. However, as the regulations regarding exhaust gases are becoming stricter, it is becoming difficult to satisfy a demanded purification level only with the use of a catalyst. Further, purification with a catalyst needs a high exhaust gas temperature and the purification efficiency with a catalyst may be low at the beginning of a purification process.

In order to solve the problems associated with the use of a catalyst, various systems utilizing a plasma generated by an electric discharge have been proposed. In particular, in the field of automobiles, it is well known to use an electric discharge in combination with an exhaust gas purifying catalyst to purify $NO_x$, CO (carbon monoxide), HC (hydrocarbon contents), and PM (particulate matter).

For example, Japanese Unexamined Patent Publication (Kokai) No. 2001-159309 proposes generating an electric discharge in an exhaust pipe by using a discharge apparatus disposed upstream of a catalyst, and injecting a hydrocarbon as a reducing agent upstream of the discharging apparatus. According to this technique, the oxidation from NO into $NO_2$ in the discharging apparatus can be accelerated due to the presence of the hydrocarbon. Also, this publication proposes injecting a reducing agent upstream of a catalyst, and generating an electric discharge plasma on the catalyst. According to this technique, the reaction on the catalyst is accelerated, and then the purification activity can be enhanced.

With respect to the use of an electric discharge plasma for purifying an exhaust gas from a boiler, a heating furnace, etc., Japanese Unexamined Patent Publication (Kokai) No. 6-343820 has proposed to supply water vapor into a plasma generating device and supply the obtained water-vapor plasma into an exhaust gas, whereby harmful components in the exhaust gas are oxidized and rendered harmless. In this publication, it is disclosed that active chemical species such as O, OH, H, $H_2O$ and $O_3$ are obtained by adding water vapor to the plasma generating device.

As stated above, the use of a plasma, particularly the use of a combination of a plasma and catalyst, has been proposed regarding the purification of an exhaust gas. However, the restrictions regarding purification of an exhaust gas are becoming stricter from year to year, and further improvements in an exhaust gas purifying apparatus are demanded.

Accordingly, the present invention provides an novel exhaust gas purifying apparatus and its control method.

DISCLOSURE OF THE INVENTION

Exhaust gas purifying apparatuses and the control methods thereof according to the present invention are as follows:
(1) An exhaust gas purifying apparatus, comprising:
a $NO_x$ purifying catalyst disposed in an exhaust gas pipe through which an exhaust gas flows;
a plasma generator for converting a gas into a plasma and supplying the plasma to the exhaust pipe at the upstream of the $NO_x$ purifying catalyst;
a switching device for selectively supplying one of a recirculated exhaust gas and air as a gas to be converted into a plasma to the plasma generator; and
an injector for adding a reducing agent to the gas to be converted into a plasma or a plasma converted from the gas by the plasma generator.
(2) The exhaust gas purifying apparatus described in (1) above wherein the plasma generator is a plasma torch, and the injector adds a reducing agent to a plasma converted from the gas by the plasma torch.
(3) The exhaust gas purifying apparatus described in (1) or (2) above, wherein the apparatus further comprises a water supplying device for adding water to the gas to be converted into a plasma or a plasma converted from the gas by the plasma generator.
(4) The exhaust gas purifying apparatus described in any one of (1) to (3) above, wherein the apparatus further comprises a particulate filter disposed downstream of a region in the exhaust pipe whereto a plasma converted from the gas by the plasma generator is supplied.
(5) A method for controlling the exhaust gas purifying apparatus described in any one of (1) to (4) above, wherein the method comprises:
when a predetermined reducing condition is satisfied, a recirculated exhaust gas is supplied to the plasma generator with use of the switching device, and the recirculated exhaust gas is converted into a plasma by the plasma generator with a reducing agent being added by the injector; and
when a predetermined oxidizing condition is satisfied, air is supplied to the plasma generator with use of the switching device, and the air is converted into a plasma by the plasma generator without a reducing agent being added by the injector.
(6) An exhaust gas purifying apparatus, comprising:
a $NO_x$ purifying catalyst disposed in an exhaust gas pipe through which an exhaust gas flows;
a first plasma generator for converting a recirculated exhaust gas into a plasma and supplying the plasma to the exhaust pipe at the upstream of the $NO_x$ purifying catalyst;
an injector for adding a reducing agent to the recirculated exhaust gas to be converted into a plasma or a plasma converted from the recirculated exhaust gas by the first plasma generator; and
a second plasma generator for converting air into a plasma and supplying the plasma to the exhaust pipe.
(7) The exhaust gas purifying apparatus described in (6) above, wherein the first plasma generator is a plasma torch, and the injector adds a reducing agent to a plasma converted from the recirculated exhaust gas by the plasma torch.
(8) The exhaust gas purifying apparatus described in (6) or (7) above, wherein the second plasma generator is a plasma torch.

(9) The exhaust gas purifying apparatus described in any one of (6) to (8) above, wherein the apparatus further comprises a water supplying device for adding water to the gas to be converted into a plasma or a plasma converted from the gas by at least one of the first and second plasma generators.

(10) The exhaust gas purifying apparatus described in any one of (6) to (9) above, wherein the apparatus further comprises a particulate filter disposed downstream of a region in the exhaust pipe whereto a plasma converted from the air by the second plasma generator is supplied.

(11) A method for controlling the the exhaust gas purifying apparatus described in any one of (6) to (10) above, wherein the method comprising:

when a predetermined reducing condition is satisfied, a recirculated exhaust gas is converted into a plasma by the first plasma generator with a reducing agent being added by the injector and, particularly, the second plasma generator is not operated; and when a predetermined oxidizing condition is satisfied, air is converted into a plasma by the second plasma generator and, particularly, the first plasma generator is not operated.

According to the present exhaust gas purifying apparatus described in (1) or (6) above, it is possible to selectively convert a recirculated exhaust gas and air into plasma. Further, according to the exhaust gas purifying apparatus of these embodiments, a reducing agent is optionally added to the gas to be converted into a plasma or a plasma converted from the gas by the plasma generator, and thereby the reducing agent can be converted into a low molecular weight component having high reactivity through radical formation and cracking, and/or can be vaporized.

According to the present exhaust gas purifying apparatus described in (2), (7) or (8) above, a plasma can be generated in a relatively small area, that is, a high plasma density can be obtained with a relatively small energy consumption.

The term "plasma torch" as used in the present invention means a plasma generating device of converting a gas supplied thereto into a plasma and supplying the plasma, particularly a plasma generating device capable of jetting out the obtained plasma from the distal end part thereof.

According to the exhaust gas purifying apparatus described in (3) or (9) above, water can be supplied to one or both of a recirculated exhaust gas or air to be converted into a plasma, or a plasma converted from them in order to produce OH radical and O radical, etc.

The water supplying device may be a device for adding water as a water vapor, or a water injector for adding water by injection. Further, if the water supplying device is a water injector, the water injector may be a separate water injector from an injector for an reducing agent, but the injector for injecting a reducing agent may work at the same time as the water supplying device for adding water.

According to the present exhaust gas purifying apparatus described in (4) or (10) above, PM (Particulate Matter) in an exhaust gas, particularly in an exhaust gas from a diesel engine, can be trapped on the particulate filter disposed in the exhaust pipe.

According to the present controlling method described in (5) or (11) above, by converting a recirculated exhaust gas into a plasma with a reducing agent being added when a reducing condition is satisfied, the reducing agent can effectively be converted into a low molecular weight component having high reactivity through radical formation and cracking, and/or can be vaporized. This is because a recirculated exhaust gas has a lower oxygen concentration and thereby, the less reducing agent is consumed due to a reaction with oxygen; and a reducing agent is diluted with a recirculated exhaust gas and thereby, generation of soot is suppressed.

The "reducing condition" can be predetermined as a condition wherein it is preferable to supply an active reducing gas into an exhaust gas stream. Therefore, for example, the reducing condition can be predetermined such that the reduction of $NO_x$, particularly the reduction of $NO_x$ stored in a $NO_x$ storage reduction catalyst, is promoted with the active reducing agent obtained. Concretely, the reducing condition can be predetermined such that a reducing treatment is performed at a predetermined interval.

In the case where a recirculated exhaust gas is converted into a plasma with an addition of water, OH (hydroxy) radical, an O (oxygen) radical, etc. obtained by converting water into a plasma accelerates cracking and reforming; and is bonded to the terminal of a reducing agent molecular chain broken by the plasma, thereby preventing production of an unsaturated hydrocarbon or suppressing the generation of soot.

Further, according to the controlling method described in (5) or (11) above, by converting air into a plasma without a reducing agent being added by the injector when an oxidizing condition is satisfied, a highly oxidative content such as an oxygen radical, ozone, etc. can be effectively produced. This is because air has a higher oxygen concentration than a recirculated exhaust gas.

The "oxidizing condition" can be predetermined as a condition wherein it is preferable to supply an active oxidizing gas into an exhaust gas stream. Therefore, for example, the oxidizing condition can be predetermined such that the active oxidation gas is supplied into a low temperature exhaust gas stream, e.g. when an internal combustion engine is just started, to promote the oxidation of HC in the low temperature exhaust gas (so-called "cold HC").

In the case where the exhaust gas purifying apparatus to be controlled further comprises a particulate filter, particularly so-called diesel particulate filter, the oxidizing condition can be predetermined such that an active oxidizing gas is supplied to an exhaust gas stream to promote oxidization-removal of the accumulated PM on the filter when a predetermined amount of PM is accumulated on the filter. An amount of PM accumulated on a particulate filter can be determined from a gas-flow resistance through a particulate filter, an elapsed time after the previous oxidation treatment, etc.

In the case where air is converted into a plasma with addition of water, the production of oxygen radical, ozone, OH radical, etc. can further be promoted. This is because water molecule easily generates OH radical, and the OH radical initiates various reactions.

BEST MODE FOR CARRYING OUT THE INVENTION

The present invention is specifically described below based on the embodiments shown in the Figures. Each Figure is a view for showing the concept of the present invention but the present invention is not limited to the embodiments.

<First Exhaust Gas Purifying Apparatus According to The Present Invention>

Figure 1:
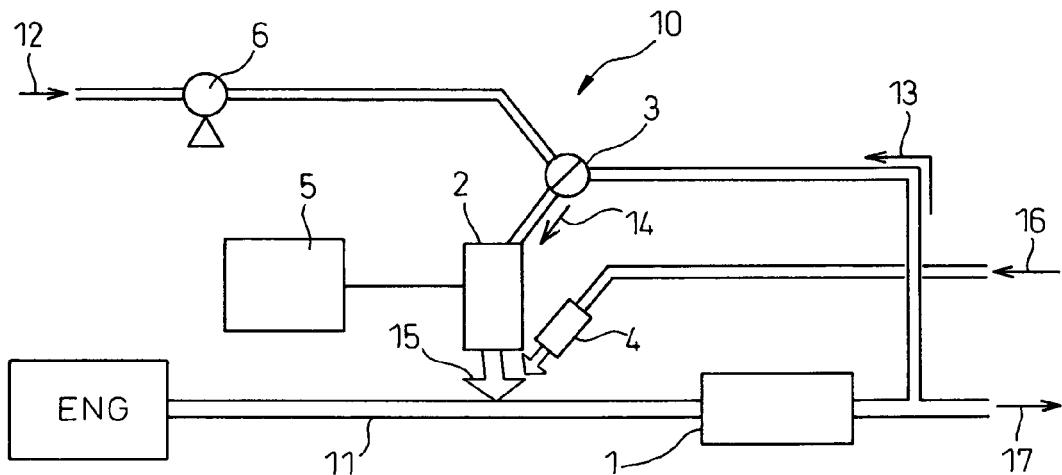
FIG. 1 is a schematic view showing an embodiment of the exhaust gas purifying apparatus according to the present invention.

FIG. 1 schematically shows one embodiment of the exhaust gas purifying apparatus of the present invention.

As shown in FIG. 1, the exhaust gas purifying apparatus of the present invention 10 comprises a $NO_x$ purifying catalyst 1 disposed in an exhaust gas pipe 11 for an internal combustion engine (ENG); a plasma generator 2 for converting a gas (arrow 14) into a plasma and supplying the plasma to the exhaust pipe 11 at the upstream of the $NO_x$ purifying catalyst 1; a switching device 3 for selectively supplying one of a recirculated exhaust gas (arrow 13) and air (arrow 12) to the plasma generator 2; and an injector 4 for adding a reducing agent (arrow 16) to the gas (arrow 14) to be supplied to the plasma generator 2 or a plasma 15 produced by the plasma generator 2. The plasma generator is powered by an electric power supply 5. Air (arrow 12) is supplied to the plasma generator 3 via the switching device 3 with use of a pump 6. An exhaust gas from an internal combustion engine (ENG) flows through a $NO_x$ purifying catalyst 1, and then is exhausted as shown by the arrow 17.

When using the exhaust gas purifying apparatus 10 shown in FIG. 1, a recirculated exhaust gas (arrow 13) or air (arrow 12) is converted into a plasma when required and, optionally, a reducing agent (arrow 16) is added to the gas (arrow 14) to be supplied to the plasma generator 2 or the plasma 15 produced by the plasma generator 2.

That is, when using the exhaust gas purifying apparatus 10 shown in FIG. 1, when a predetermined reducing condition is satisfied, it is possible to convert a recirculated exhaust gas into a plasma by the plasma generator with a reducing agent being added by the injector 4, such that the reducing agent is converted into a low molecular weight component having a high reactivity through radical formation and cracking, and/ or is vaporized. Also, when a predetermined oxidizing condition is satisfied, it is possible to covert air into a plasma by the plasma generator 2 without a reducing agent being added by the injector 4, such that an oxygen radical, ozone, etc. having large oxidation activity are effectively produced.

Judgment of the reducing and oxidizing conditions, the control of a switching of a recirculated exhaust gas and air based on the judgment, and the control of addition of a reducing agent, etc. can be achieved with use of a multi-purpose electronics device such as ECU (Engine Control Unit), a single-purpose electronics device, etc.

<Second Exhaust Gas Purifying Apparatus according to The Present Invention>

Figure 2:
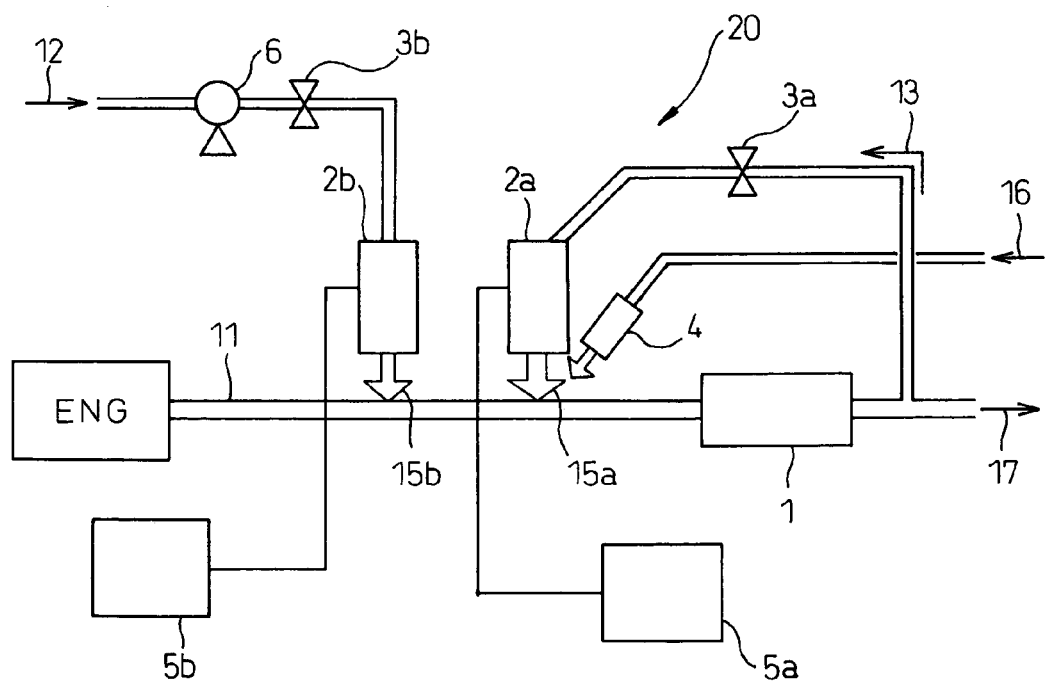
FIG. 2 is a schematic view showing another embodiment of the exhaust gas purifying apparatus according to the present invention.

FIG. 2 schematically shows another embodiment of the exhaust gas purifying apparatus of the present invention.

The exhaust gas purifying apparatus of the present invention shown in FIG. 2 comprises two plasma generators 2a and 2b respectively for a recirculated exhaust gas and for air, while the exhaust gas purifying apparatus of the present invention 10 shown in FIG. 1 can alternatively supply a recirculated exhaust gas and air to one plasma generator 2. Along this modification, the exhaust gas purifying apparatus 20 of the present invention shown in FIG. 2 comprises control valves 3a and 3b rather than a switching device 3, and supplies electric power to the plasma generators 2a and 2b respectively from electric power supplies 5a and 5b.

When using the exhaust gas purifying apparatus 20 shown in FIG. 2, and a predetermined reducing condition is satisfied, it is possible to convert a recirculated exhaust gas into a plasma with a reducing agent being added. Also, when a predetermined oxidizing condition is satisfied, it is possible to covert air into a plasma without a reducing agent being added.

For the details of a reducing and oxidizing conditions, a control device, etc., descriptions for the exhaust gas purifying apparatus 10 of the present invention shown in FIG. 1 can be referred.

Each element of the exhaust gas purifying apparatus of the present invention is described in more detail below.

<$NO_x$ Purifying Catalyst>

The $NO_x$ purifying catalyst 1 which can be used in the exhaust gas purifying apparatus of the present invention may be any kind of catalyst which catalyzes a reduction from $NO_x$ to $N_2$. The $NO_x$ purifying catalyst may be so-called a $NO_x$ storage-reduction catalyst, a $NO_x$ selective reduction catalyst or a three-way catalyst.

The $NO_x$ storage-reduction catalyst is a catalyst which stores $NO_x$ when an air/fuel ratio is in lean, and reduces the stored $NO_x$ into $N_2$ when an air/fuel ratio is in rich, i.e. when a rich spike is provided (when a fuel is injected into an exhaust gas flow). For example, the $NO_x$ storage-reduction catalyst is a catalyst wherein a porous metal oxide such as an alumina carries one or more noble metals such as Pt, Rh, Pd, Ir and Ru, and one or more $NO_x$ storage elements such as alkali metals, alkali earth metals and rare earth metals.

The $NO_x$ selective reduction catalyst is a catalyst which selectively reduces or decomposes $NO_x$ in an exhaust gas. The $NO_x$ selective reduction catalyst is used for purifying $NO_x$ in an exhaust gas emitted from an internal combustion engine driven at a lean air/fuel ratio. For example, the $NO_x$ selective reduction catalyst is a zeolite exchanged with transition metals such as Cu, or a zeolite or alumina carrying one or more noble metals.

The three-way catalyst is a catalyst which converts CO, HC and $NO_x$ in an exhaust gas emitted from an internal combustion engine driven at near theoretical air/fuel ratio into $CO_2$, H₂O and N₂. For example, the three-way catalyst is an alumina carrying a mixture of Pt and Rh, or a mixture of Pd and Rh.

These catalysts can be carried on any kind of substrate such as ceramic honeycomb substrate by wash coating process etc.

<Switching Device for Gas to be Supplied and Control Valve>

The switching device 3 for a gas to be supplied which can be used for the exhaust gas purifying apparatus of the present invention can be any kind of device such as a switching valve which can alternatively supply a recirculated exhaust gas and air. The control valves 3a and 3b may be any kind of valve which can control supply of a recirculated exhaust gas and air flowing therethrough.

<Injector>

The injector 4 which can be used for the exhaust gas purifying apparatus of the present invention can be any kind of device which can jet out a reducing agent to be supplied, such as a device having a structure known for an injector for injecting a fuel directly into a combustion chamber of an internal engine.

Figure 3:
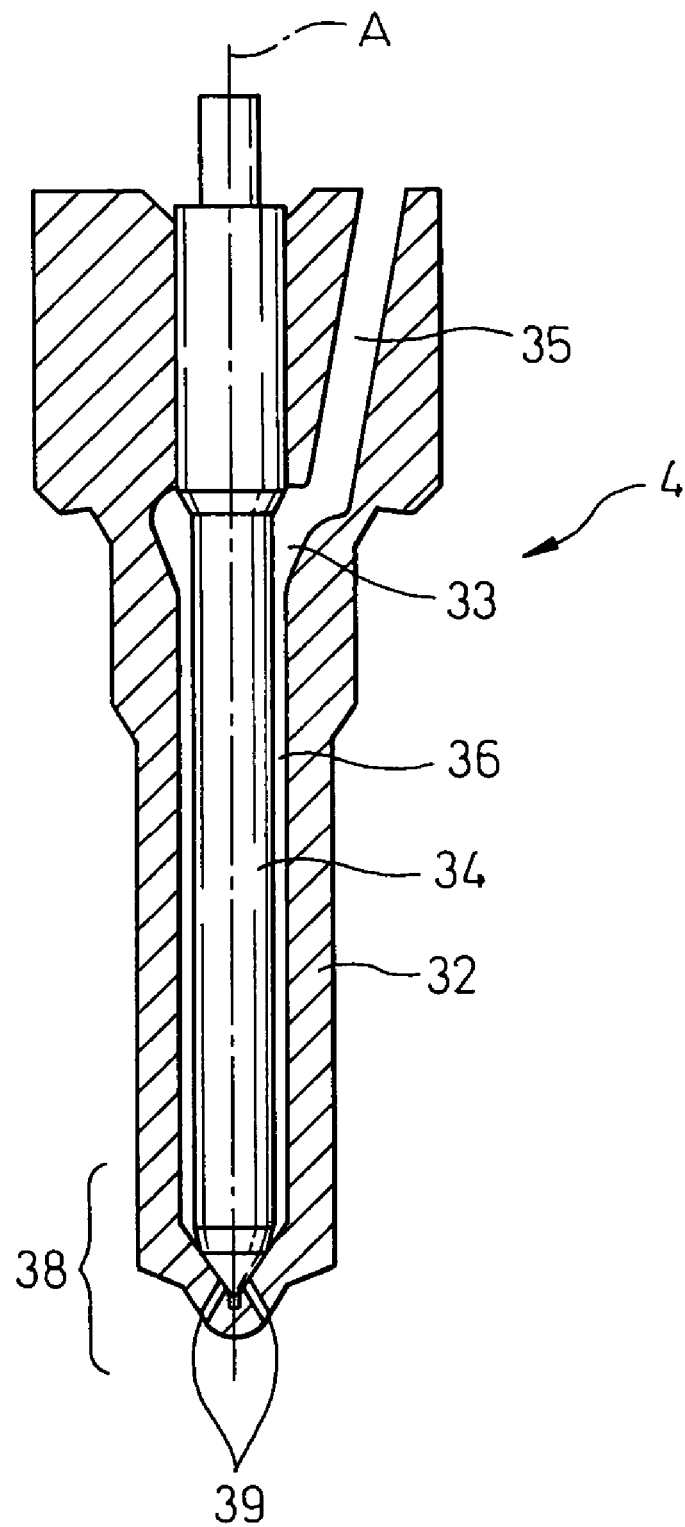
FIG. 3 is an enlarged cross-sectional view showing an injector which can be used for the present invention.

For example, the injector is as shown in FIG. 3. The injector 4 shown in FIG. 3 comprises a nearly cylindrical nozzle 32 having a hollow space 33 therein, and a nearly columnar needle valve 34 which slides (moves) in the hollow space 33 of the nozzle 32. The nozzle 32 and the needle valve 34 are disposed such that their axial lines "A" run coaxially. In the nozzle 32, a supply passage 35 communicating with the hollow space 33 is provided. The supply passage 35 is connected to a fuel source (not shown), and a high-pressure fuel is supplied into the hollow space 33 through the supply passage 35. The fuel to be supplied flows to the distal end portion 38 of the nozzle 32 through an annular path 36 between the needle valve 34 and the inner wall surface of the nozzle 32, and is injected from injection holes 39 at the distal end portion 38 of the nozzle 32. In this injector, the inlet of the injection holes 39 is closed or opened by sliding the needle valve 34 in the hollow space 33 to bring the distal end of the needle valve 34 into contact with the inner wall surface of the nozzle distal end portion 38, whereby the injection of a fuel from the injection port 39 is controlled.

A reducing agent injected by the injector can arbitrarily be selected, and may be a hydrocarbon such as gasoline, a light oil, an ether or an alcohol. That is, if the exhaust gas purifying apparatus of the present invention is used for purifying an exhaust gas from an internal combustion engine, a fuel used for generating motive energy with the internal combustion engine, e.g. gasoline, or another reducing agent may be used as a reducing agent in the present invention.

<Plasma Generator>

The plasma generator 2, 2a and 2b which can be used for the exhaust gas purifying apparatus of the present invention may have any structure which can convert a gas supplied thereto into a plasma and supply the plasma to an exhaust gas pipe. The plasma generator 2, 2a and 2b may be an electric-discharge plasma generator which produces a plasma with use of an electric discharge, a microwave plasma generator which produces a plasma with use of a microwave, or inductive-coupling plasma generator which produces a plasma with use of an inductive coupling. Also, the plasma generator may be an electric-discharge plasma generator as shown in Japanese Unexamined Patent Publication No. 2001-159309 and 6-343820.

Figure 4A:
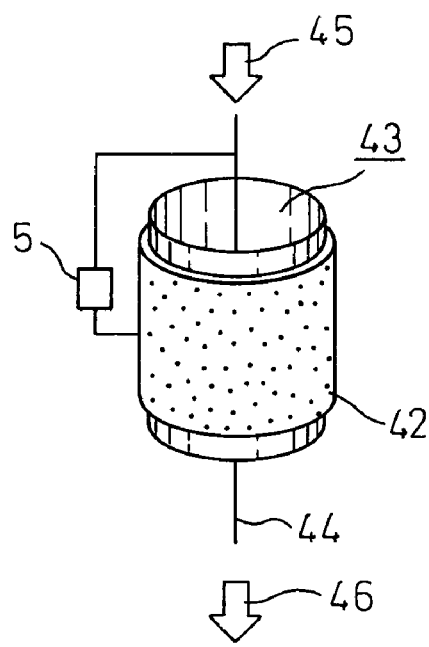
FIGS. 4a and 4b are respectively schematic perspective and cross-sectional views showing a plasma generator which can be used for the present invention.
Figure 4B:
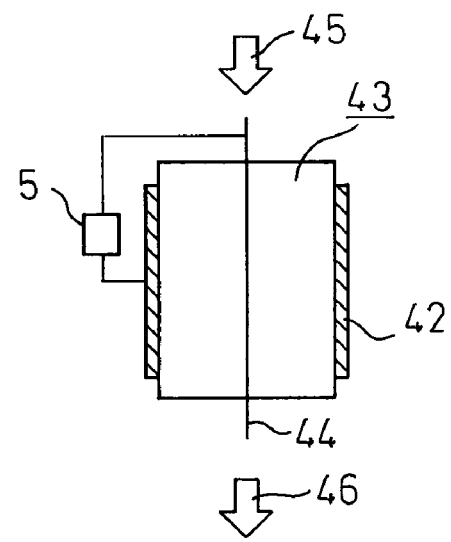

A plasma generator which can be used for the exhaust gas purifying apparatus of the present invention may be one which forms a plasma-generating space in the plasma generator. FIGS. 4a and 4b show a perspective view and a side sectional view of the plasma generator, respectively.

The plasma generator 40 shown in FIGS. 4a and 4b comprises a cylindrical outer electrode 42 and a center electrode on the central axis of the outer electrode 42. A flow channel 43 through which a gas to be converted into a plasma flows is formed between the cylindrical outer electrode 42 and the center electrode 44. When using the plasma generator 40, a gas to be converted into a plasma flows through the flow channel 43 as shown with arrows 45 and 46, and electric voltage is applied between the cylindrical outer electrode 42 and the center electrode 44 to generate an electric discharge in the flow channel 43.

The center electrode 44 may be made of any material that makes it possible to apply a voltage between the center electrode 44 and the cylindrical outer electrode 42. The material may be an electrically conductive material, an electrically semi-conductive material, etc. and especially, a metal such as copper, tungsten, stainless steel, iron, platinum and aluminum, with stainless steel being most preferable due to its durability and low cost. The center electrode 44 may be a metal wire, but it may be a hollow bar.

The cylindrical outer electrode 42 may be made of any material described for the center electrode 44. The outer electrode 42 may be made by surrounding a mesh or foil of these metal materials around an insulative cylindrical body defining the flow channel 43, or by applying a conductive paste on the circumference surface of the cylindrical body defining the flow channel 43.

The electric power supply 5 may be one supplying a pulse or constant direct current (DC) voltage, or an alternating current (AC) voltage. A voltage to be applied between the center electrode 44 and the cylindrical outer electrode 44 and the pulse period of the applied voltage may be those generally used for generating a plasma. Any voltages such as a DC voltage, an AC voltage, and a periodic-wave-form voltage can be applied between the electrodes. Preferably, a DC pulse voltage, for example a DC voltage having a pulse voltage of 50 kV and pulse cycle of 2000 Hz, is applied, since it can generate a stable corona electric discharge. The applied voltage, pulse width and pulse cycle of the DC pulse voltage may be optionally determined as long as it generates a corona electric discharge. A high voltage and short pulse cycle is desirable in order to generate a corona electric discharge, though those parameters may be restricted by the design of the apparatus, an economic value, etc. In the case where a DC voltage is applied between the center electrode 44 and the cylindrical outer electrode 42, the center electrode 44 may be a cathode or anode. Further, one of the electrodes can be grounded.

Figure 5A:
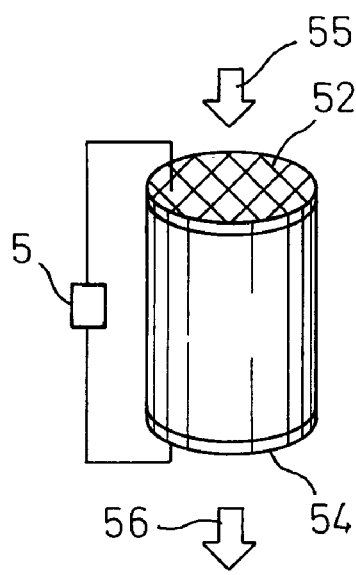
FIGS. 5a and 5b are respectively schematic perspective and cross-sectional views showing another plasma generator which can be used for the present invention.
Figure 5B:
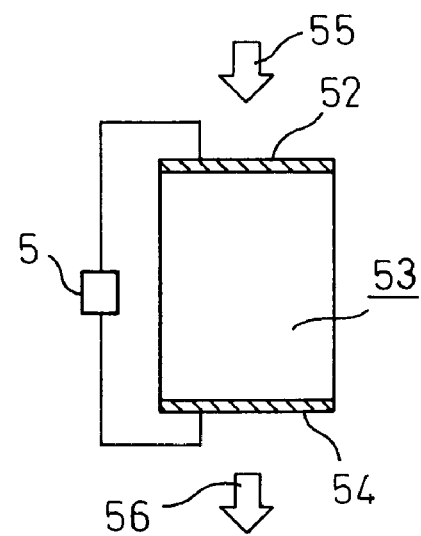
Figure 6:
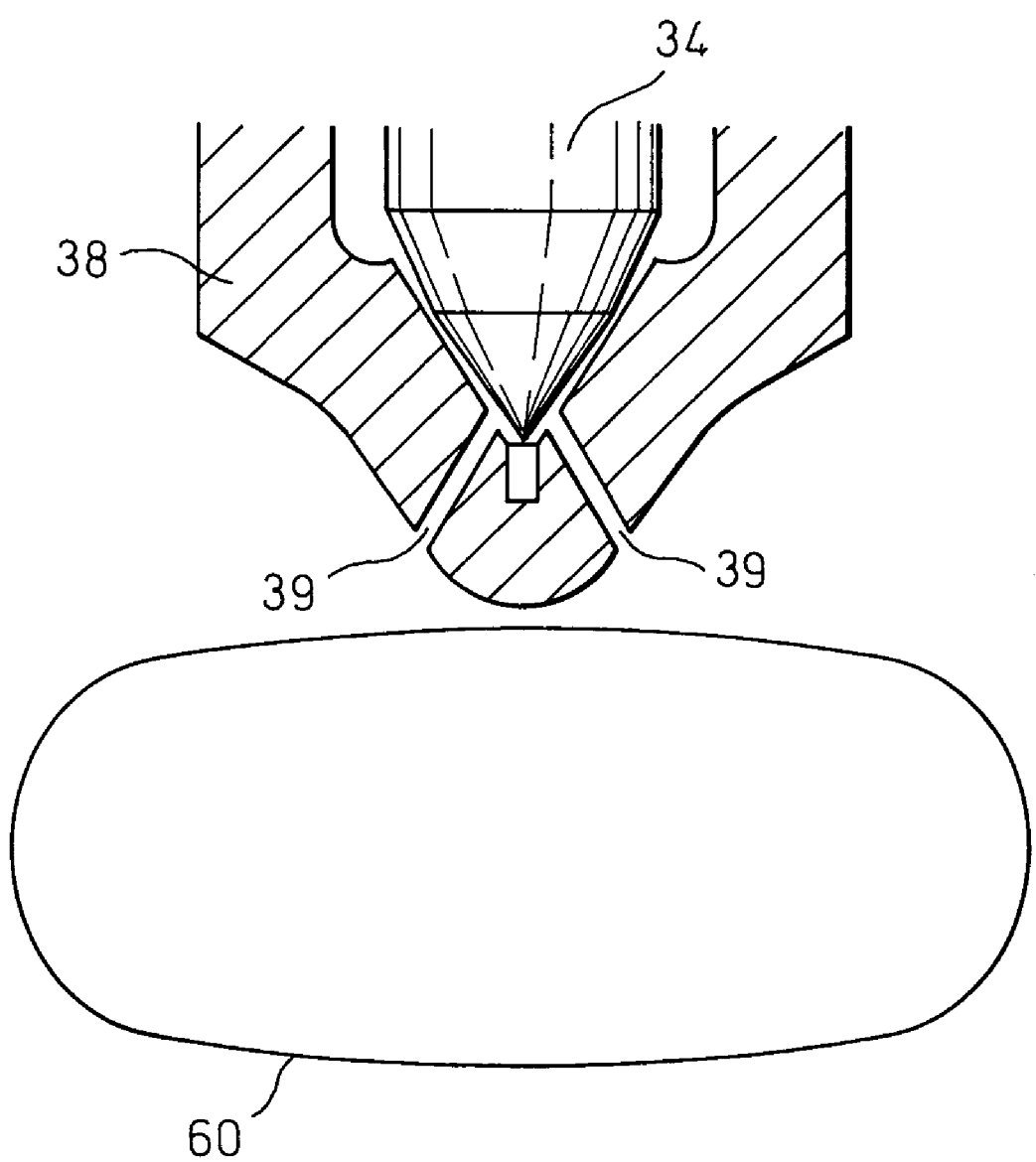
FIG. 6 is a schematic cross-sectional view showing a concept of a plasma conversion of a reducing agent by a plasma torch.

The plasma generator used for the exhaust gas purifying apparatus of the present invention may be the plasma generator shown in FIGS. 5a and 5b. FIGS. 5a and 5b show a perspective view and a side sectional view of the plasma generator, respectively.

The plasma generator 50 shown in FIGS. 5a and 5b comprises an upstream and downstream mesh-like electrodes 52 and 54 and a flow channel 53, such that a gas to be converted into a plasma flows through them. When using the plasma generator 50, a gas to be converted into a plasma flows through the flow channel 53 as shown with arrows 55 and 56, and an electric voltage is applied between the mesh-like electrodes 52 and 54 by an electric power supply 5 to generate an electric discharge in the flow channel 53. The description of the materials used for electrodes, the power supply, etc. of the plasma generator of FIGS. 4a and 4b may be referred for the plasma generator 50 of FIGS. 5a and 5b.

<Plasma Generator—Plasma Torch>

A plasma generator 2, 2a and 2b which can be used for the exhaust gas purifying apparatus of the present invention can be a plasma torch which converts a gas into a plasma and jetting the plasma out. In this case, it is possible to add a reducing agent to a gas to be supplied to the plasma torch to convert the obtained mixture of the gas and the reducing agent, or to add a reducing agent to a plasma jetted out from the plasma torch.

In the case where a reducing agent is added to a plasma jetted out from a plasma torch, the reducing agent can be injected from a jetting port 39 disposed at the distal end part 38 of an injecting nozzle 32 of injector 4 to a plasma, particularly to a plasma 60 near the injection port 39 of an injector. In the case where a plasma 60 is generated in a region near the injection port 39 of an injector by a plasma torch, this plasma 60 in the vicinity of the injection port 39 is not in the entirety but a part of a space such as an exhaust pipe where a reducing agent is injected by the injector, and may be, for example, a region within 5 cm, particularly within 2 cm, more particularly within 1 cm, from the injection port 39.

A plasma torch may be separated from an injector for injecting a reducing agent. In this case, the region where the plasma is supplied is separated from the injector, so that the injector can be prevented from deterioration due to the plasma.

An injection nozzle of the injector may be disposed in the plasma torch such that the gas to be converted into a plasma can flow between the inner wall of the plasma torch and the injection nozzle of the injector. In this case, contact between the plasma and a reducing agent injected from the injector can be improved.

In the case where an injection nozzle of the injector is disposed in the plasma torch as stated above, a discharge plasma can be generated in the vicinity of the injection port of the injector by using the injection nozzle of the injector as a discharge electrode and applying a voltage between the injection nozzle and an electrode coupled therewith to generate an electric discharge. Also, in this case, an inductive-coupling plasma can be generated in the vicinity of the injection port by disposing an induction coil surrounding the injection port of the injector, supplying a high-frequency current from a high-frequency electric power source to the induction coil, and generating a magnetic field and then an eddy current in the vicinity of the injection port.

<Plasma Generator—Plasma Torch>

The plasma torch which can be used for the present invention may have any structure and, for example, may have a structure shown in FIGS. 7 to 12.

<Plasma Generator—Plasma Torch—Electric Discharge Plasma Torch>

Figure 7:
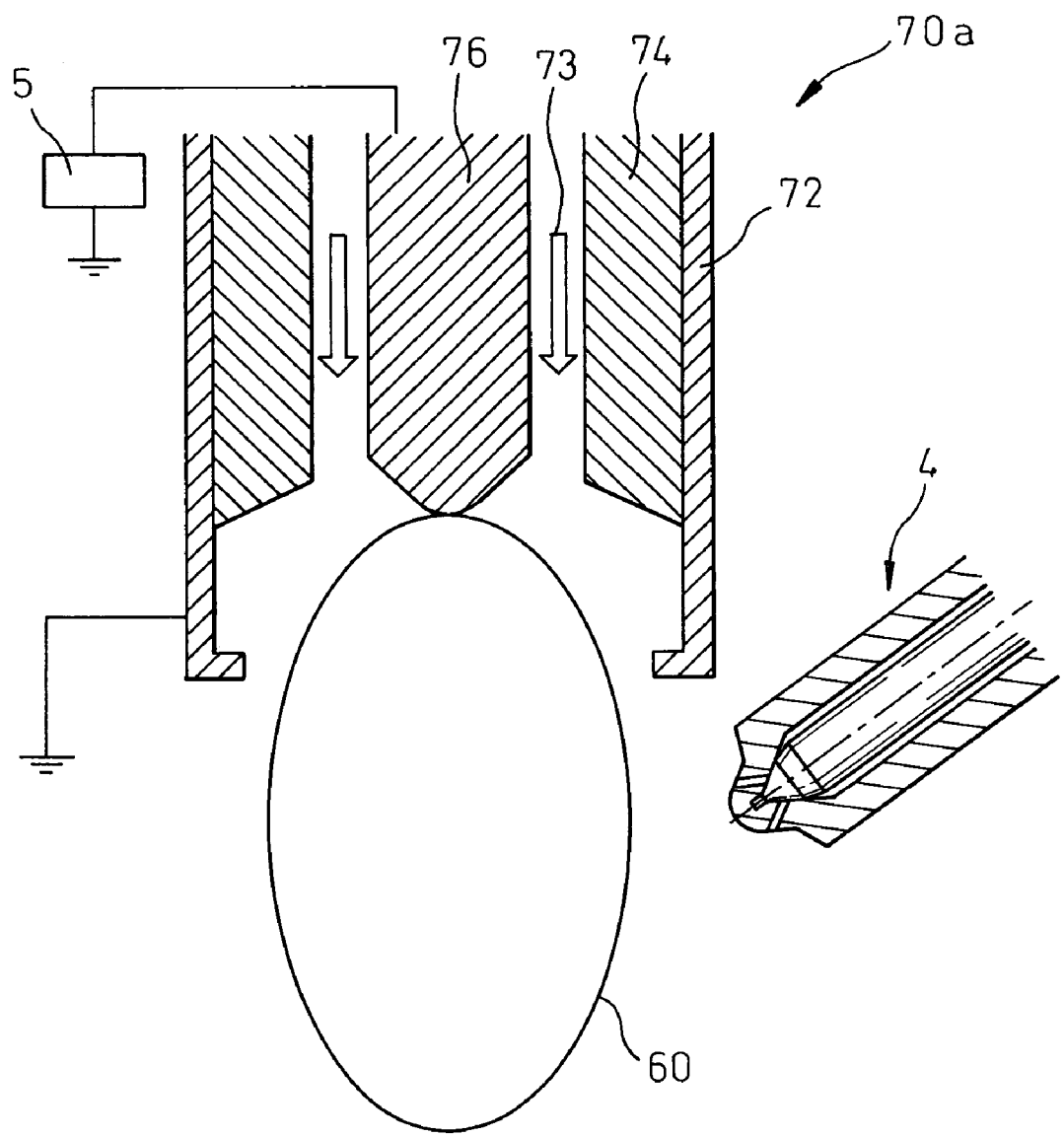
FIG. 7 is a schematic cross-sectional view showing an embodiment of an electrical discharge plasma torch and an injector which can be used for the present invention.

The plasma torch 70a shown in FIG. 7 utilizes an electric discharge plasma. In the electric discharge plasma torch 70a shown in FIG. 7, a discharge electrode 76 is disposed on the central axis of an electrically conductive cylindrical duct 72 for passing a gas to be converted into a plasma therethrough, and an insulative material 74 is disposed between the duct 72 and the discharge electrode 76. The duct 72 and the discharge electrode 76 are respectively connected to the ground and an electric power source 5 to work as counter electrodes. The duct 72 and the discharge electrode 76 may be a cathode or an anode. Also, the duct 72 or the discharge electrode 76 may be grounded.

When using this plasma torches 70a and 70b, an electric discharge is generated between the duct 72 and the discharge electrode 76 with use of the electric power source 5, whereby a gas 73 supplied through a flow channel in the plasma torch is converted into a plasma. A reducing agent is injected from an injector 4 to a plasma region 60.

In FIG. 7, the duct is used as an electrode, but a separate electrode can be of course used as a counter electrode of the discharge electrode 76.

Figure 8:
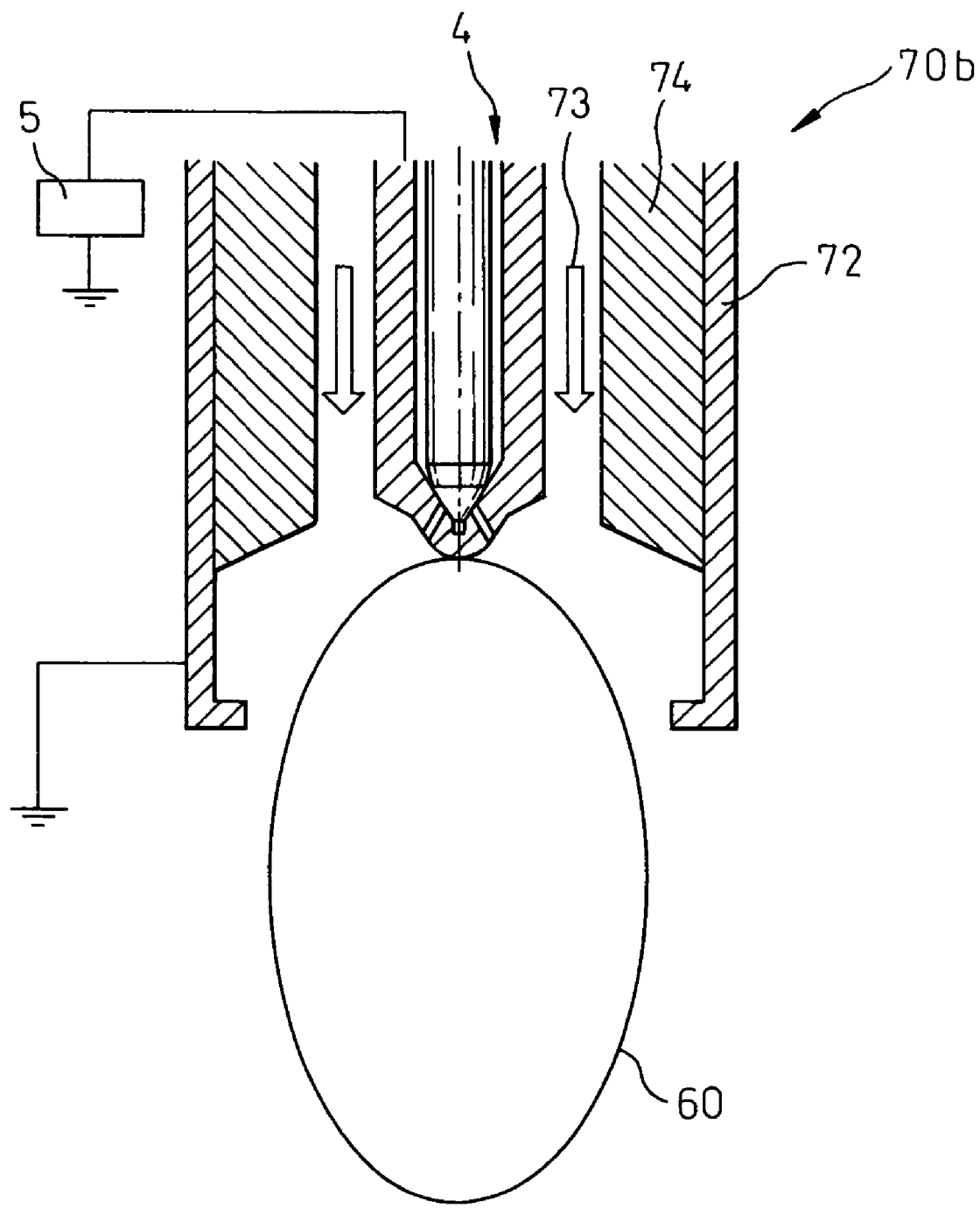
FIG. 8 is a schematic cross-sectional view showing another embodiment of an electrical discharge plasma torch and an injector which can be used for the present invention.

A mechanism shown in FIG. 8 may also be employed, where an injection nozzle of an injector 4 for injecting a reducing agent is disposed in a plasma torch, a gas 73 to be converted into a plasma is passed between the inner wall of cylindrical duct 72 of the plasma torch and the injection nozzle of the injector 4. The injection nozzle of the injector 4 can be used as an electrode.

Figure 9:
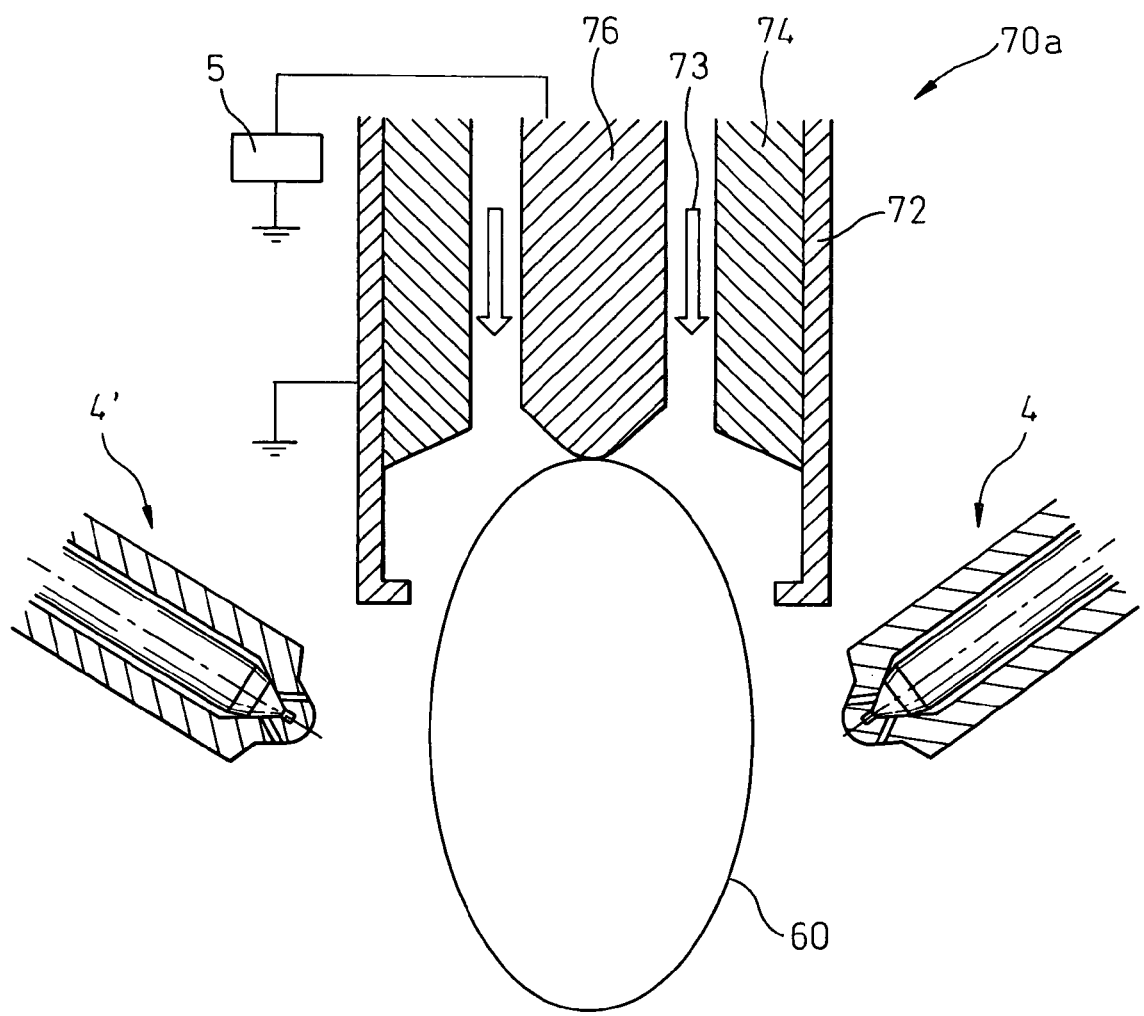
FIG. 9 is a schematic cross-sectional view showing still another embodiment of an electrical discharge plasma torch and an injector which can be used for the present invention.
Figure 10:
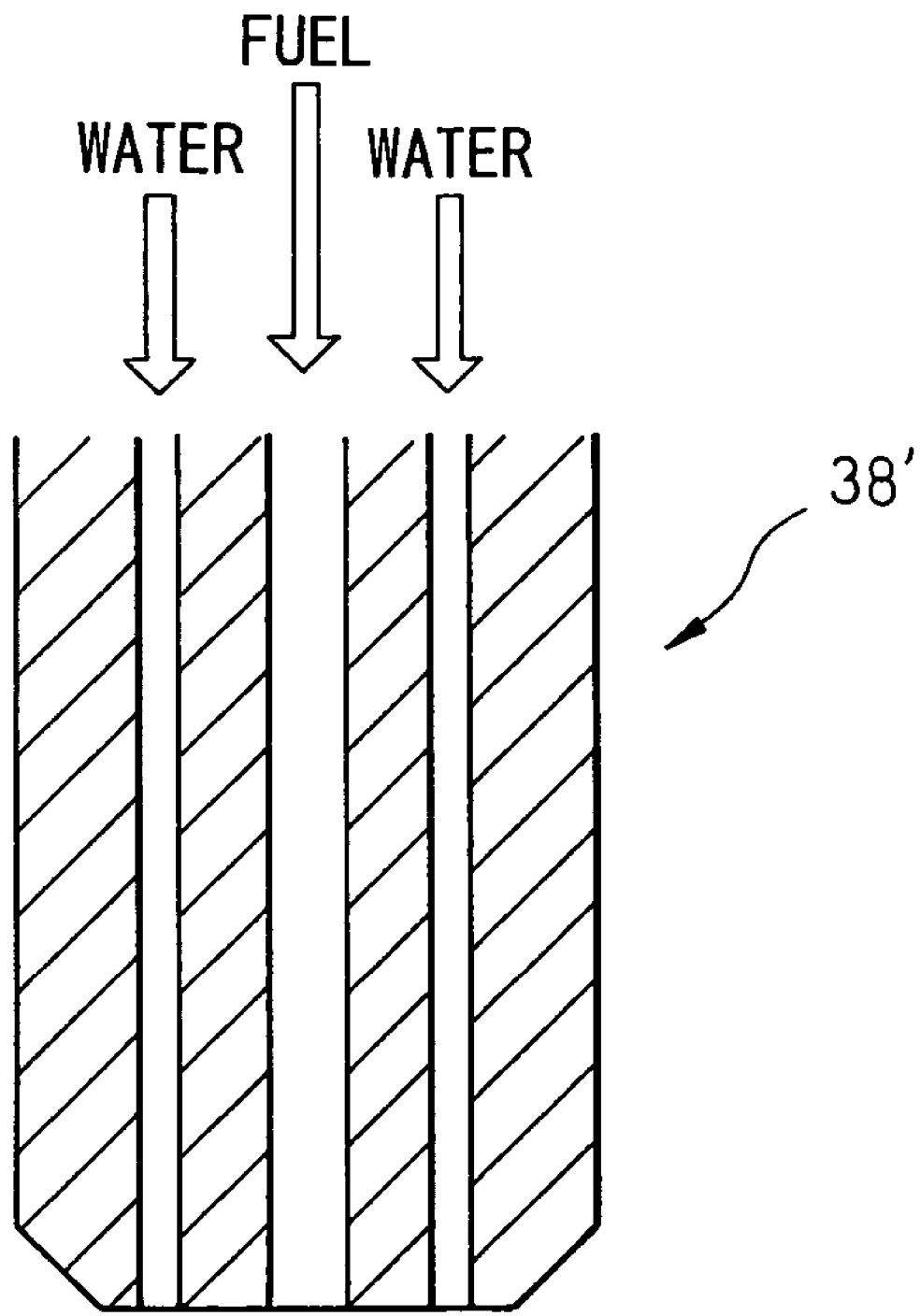
FIG. 10 is a schematic cross-sectional view showing an injection nozzle for injecting a reducing agent and water, which can be used in the invention.

Also, in the case of further adding water to the region where a plasma is generated, as shown in FIG. 9, an additional injector 4' for injecting water may be used. In this case, as shown in FIG. 10, a nozzle 38' having two coaxial paths and capable of injecting both a reducing agent and water may also be used in place of the nozzle of the injector 4 for injecting a reducing agent.

In the plasma torches 70a and 70b using an electric discharge, portions used as an electrode can be formed of a material which can work as a discharge electrode when a voltage is applied between electrodes. As for such a material, an electrically conducting material or a semiconductor material may be used, and a metal material such as copper, tungsten, stainless steel, iron and aluminum is preferred. Particularly, in an arc discharge, the electrode reaches a high temperature and therefore, a high-melting-point material such as tungsten is preferably used. Also, an insulative material may be disposed on such an electrically conductive or semiconductive material so as to generates a barrier discharge.

The discharge plasma means a plasma generated by causing a high-energy electron produced by electric discharge between electrodes to collide with a gas molecule and thereby ionizing the gas molecule into positive ions and negative ions. For generating this discharge plasma, any discharge mode may be used, and an arc discharge or corona discharge, such as barrier discharge, can be utilized.

In the case of generating a plasma in the plasma torch by using the arc discharge, the electric power source 5 can supply, for example, a voltage of 1 to 50 V and an electric current of 5 to 500 A. In the arc discharge, the electric discharge is maintained by electrons emitted from a cathode. As for the electric current for generating the arc discharge, not only a direct current but also an alternating current can be used.

The arc discharge is advantageous in that the output can be easily increased by increasing the discharge current or discharge voltage, and that stable electric discharge can continue for a long period of time. Also, the arc discharge is advantageous in that the apparatus and technique for generating the arc discharge are simple and the cost of equipment is relatively low.

In the case of generating a plasma in the plasma torch by using corona discharge, the electric power source 5 may supply either a pulsed DC voltage or a pulsed AC voltage. As for the voltage applied between electrodes, a voltage of 1 to 100 kV and, for example, 5 to 20 kV, can be generally used. The pulse period of the applied voltage may be from 0.1 μs to 10 ms, and particularly from 0.1 to 10 μs.

Incidentally, in view of stability of plasma and durability of the electrodes, it is preferred to perform barrier discharge by disposing an insulative material on the electrode.

<Plasma Generator—Plasma Torch—Inductive Coupling plasma Torch>

Figure 11:
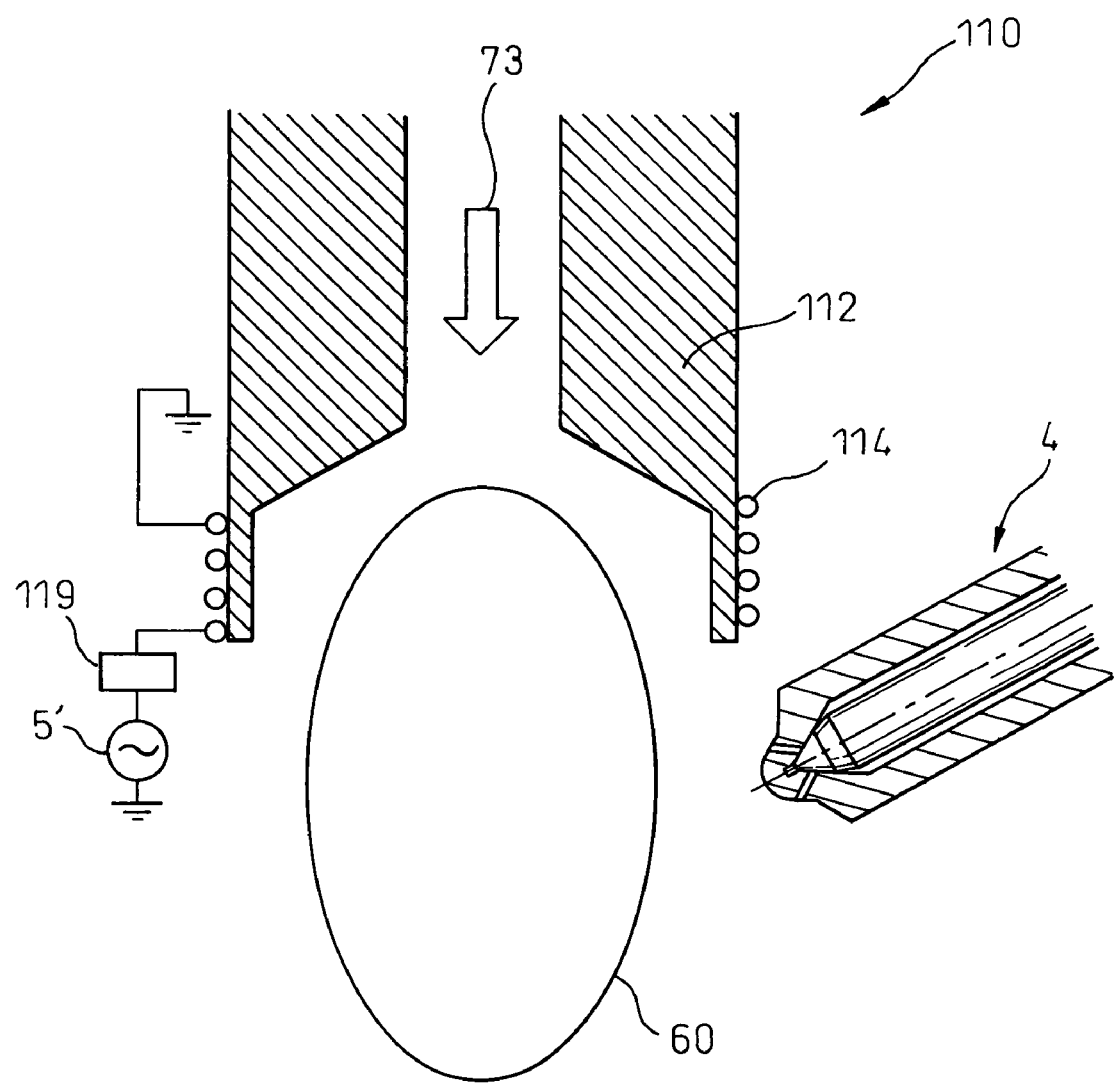
FIG. 11 is a schematic cross-sectional view showing one embodiment of an inductive-coupling plasma torch and an injector.

A plasma torch 110 shown in FIG. 11 utilizes an inductive coupling plasma. In the plasma torch 110 shown in FIG. 11, the distal end portion of a duct 112 for passing a gas to be converted into a plasma is formed of an electromagnetic wave-transmitting material, for example, an insulative material such as quartz, and an induction coil 114 for generating an induced electric field is disposed around the distal end portion. The induction coil is connected at one end to a high-frequency electric power source 5' via a matching box 119 and is grounded at the other end.

When using the plasma torch 110, a high-frequency current is supplied from the high-frequency electric power source 5' to the induction coil 114 while adjusting the impedance by the matching box 119, such that, inside the distal end portion of the duct 112, a magnetic field and then an eddy current are generated, whereby a plasma 60 is inductively generated in the duct 112 and in the vicinity thereof. As for the high-frequency current used here, for example, a current having a frequency of 2 to 50 MHz, particularly from 3 to 40 MHz, can be used.

This inductive-coupling plasma is preferred in view of durability, because the electrode (metal portion) can be prevented from being directly exposed to a high-temperature plasma.

In the plasma torch 110 utilizing an inductive-coupling plasma, similarly to the electric discharge plasma torch 70a, 70b, the injection nozzle of an injector 4 for injecting a reducing agent can be disposed in the plasma torch, and water can be further supplied to the region where a plasma is generated.

<Plasma Generator—Plasma Torch—Microwave Plasma Torch>

Figure 12:
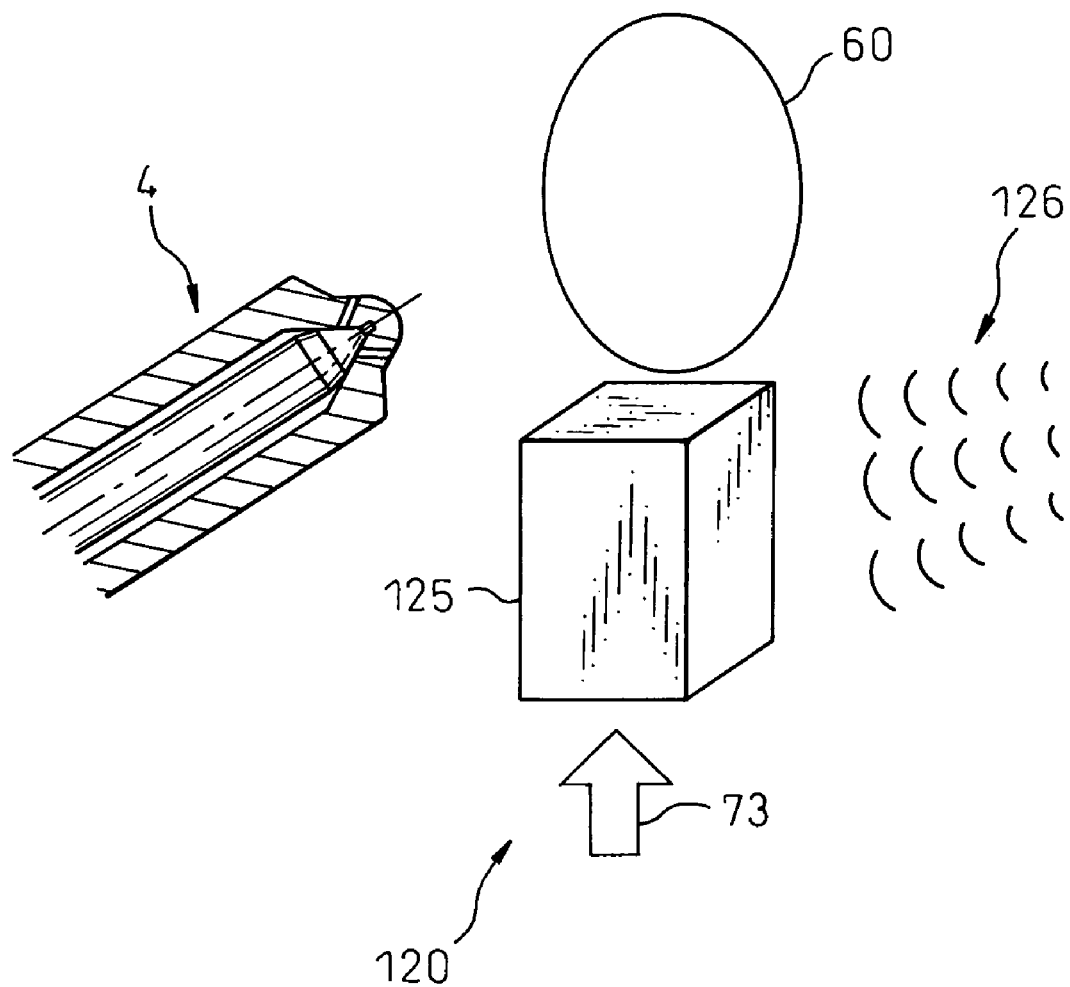
FIG. 12 is a schematic cross-sectional view showing one embodiment of a microwave plasma torch and an injector.

A plasma torch 120 shown in FIG. 12 generates a microwave plasma. In the plasma torch 120 shown in FIG. 12, a plasma-exciting material 125 is disposed in the duct for passing a gas to be converted into a plasma. The plasma-exciting material 125 accelerates excitation of a plasma in the periphery thereof upon receiving irradiation of a microwave. The plasma-exciting material is, for example, an electrically conductive ceramic, particularly, an electrically conductive ceramic sintered body such as SiC sintered body.

When using this plasma torch 120, a microwave generated by a microwave generating device such as a magnetron and, for example, a microwave at a frequency of about 2.54 GHz, are passed through a waveguide and irradiated from an antenna on a gas to be converted into a plasma, whereby the electric field strength is intensified and a plasma is generated.

Particularly, in the case of generating a microwave-induced plasma at an atmospheric pressure or at a gas pressure higher than that, it is advantageous to use a plasma-exciting material 125 and generate a plasma in the periphery of the plasma-exciting material by irradiating microwaves onto the plasma-exciting material.

Use of a microwave plasma is preferred in view of durability, because the electrode (metal portion) can be prevented from being directly exposed to a high-temperature plasma.

In the plasma torch utilizing a microwave plasma, similarly to the electric discharge plasma torch 70a, 70b, the injection nozzle of an injector 4 for injecting a reducing agent can be disposed in the plasma torch, and water can be further supplied to the region where a plasma is generated.

<Plasma>

As is generally known, "plasma" means a substance in the state that two or more freely moving positively and negatively charged particles are present together. Accordingly, the substance in the plasma state has a high potential energy, and a reducing agent can be converted, through radical formation and cracking in a plasma, into low molecular weight components having high reactivity. Furthermore, even when supplied in a liquid droplet state, a reducing agent can be momentarily vaporized and, through radical formation and cracking, converted into a low molecular weight component having high reactivity.

<Plasma—Cracking of Reducing Agent by Plasma>

Considering the very high energy state of a plasma, it would be apparent to one skilled in the art that vaporization, radical formation and cracking of a reducing agent can be momentarily performed by converting at least a part of a reducing agent into a plasma. However, in the following, cracking and the like caused by converting a hydrocarbon ($C_{13}H_{28}$) into a plasma is confirmed by an experiment.

Figure 13:
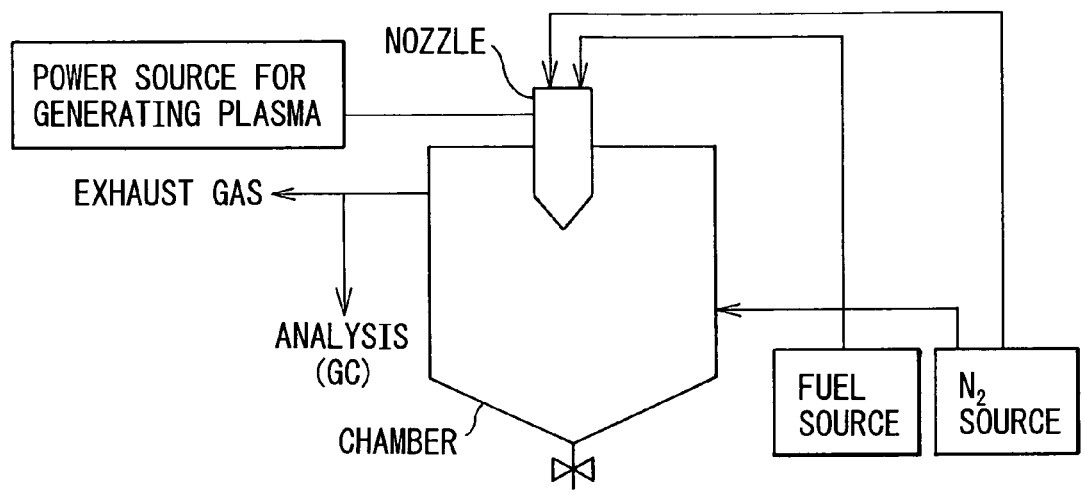
FIG. 13 is a schematic cross-sectional view showing an experimental apparatus for performing cracking of a hydrocarbon molecule by a plasma.

A testing apparatus as shown in FIG. 13 was used. In the experiment, a fuel ($C_{13}H_{28}$) from the fuel supply and $N_2$ as a carrier gas from the $N_2$ supply were mixed and supplied to the chamber via a nozzle. An electric discharge plasma was generated by an electric discharge in the nozzle. In this experiment, it was observed that a discharge plasma was jetted out from the distal end of the nozzle. The $N_2$ from the $N_2$ supply was also directly supplied to the chamber. A part of the exhaust gas from the chamber was analyzed by a gas chromatograph.

Figure 14:
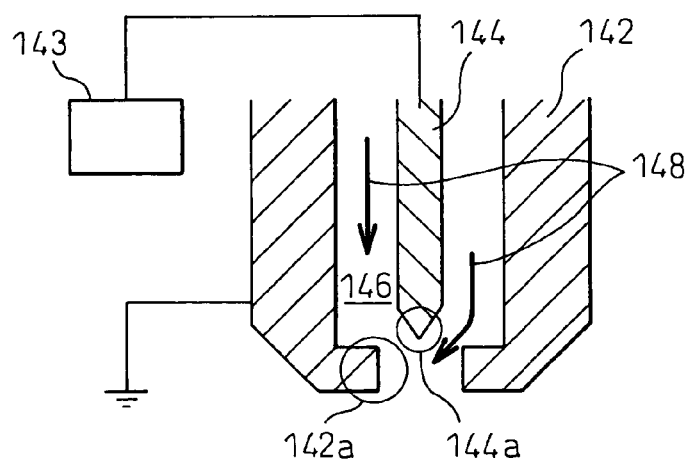
FIG. 14 is a schematic cross-sectional view showing a nozzle used in the experimental apparatus shown in FIG. 13.

FIG. 14 shows the nozzle used in this experiment for generating a plasma. The nozzle shown in FIG. 14 comprises a hollow cylindrical electrode 142 and a rod-like electrode 144 disposed on the central axis of the cylindrical electrode. A gas flow path 146 is formed between these electrodes. The arrow 148 shows the gas flow passing through the gas flow path 146. In this nozzle, a voltage is applied between the hollow cylindrical electrode 142 and the rod-like electrode 144 disposed on the central axis thereof by an electric power source 143, whereby electric discharge is generated between the distal end part 142a of the hollow cylindrical electrode 142 and the distal end part 144a of the rod-like electrode 144. Incidentally, a glass pipe is disposed inside the cylindrical electrode to cause a barrier discharge.

According to this experiment, $C_1$ to $C_3$ components were measured by gas chromatography only when a plasma was generated by electric discharge. This reveals that the plasma can crack a relatively large molecule ($C_{13}H_{28}$) into relatively small molecules ($C_1$ to $C_3$).

The invention claimed is:

1. A method for controlling an exhaust gas purifying apparatus, the exhaust gas purifying apparatus including a $NO_x$ purifying catalyst disposed in an exhaust gas pipe through which an exhaust gas flows; a plasma generator for converting a gas into a plasma and supplying the plasma to the exhaust pipe at the upstream of the $NO_x$ purifying catalyst; a switching device for selectively supplying one of a recirculated exhaust gas and air as a gas to be converted into a plasma to the plasma generator; and an injector for adding a reducing agent to the gas to be converted into a plasma or a plasma converted from the gas by the plasma generator; the method comprising:

when a predetermined reducing condition is satisfied, supplying the recirculated exhaust gas to the plasma generator with use of the switching device, and converting the recirculated exhaust gas into a plasma by the plasma generator with a reducing agent being added by the injector; and when a predetermined oxidizing condition is satisfied, supplying the air to the plasma generator with use of the switching device, and converting the air into a plasma by the plasma generator without a reducing agent being added by the injector.

2. A method for controlling an exhaust gas purifying apparatus, the exhaust gas purifying apparatus including a $NO_x$ purifying catalyst disposed in an exhaust gas pipe through which an exhaust gas flows; a first plasma generator for converting a recirculated exhaust gas into a plasma and supplying the plasma to the exhaust pipe at the upstream of the $NO_x$ purifying catalyst; an injector for adding a reducing agent to the recirculated exhaust gas to be converted into a plasma or a plasma converted from the recirculated exhaust gas by the first plasma generator; and a second plasma generator for converting air into a plasma and supplying the plasma to the exhaust pipe; the method comprising:

when a predetermined reducing condition is satisfied, converting the recirculated exhaust gas into a plasma by the first plasma generator with a reducing agent being added by the injector; and when a predetermined oxidizing condition is satisfied, converting the air into a plasma by the second plasma generator.

* * * * *